(12) United States Patent
Liao et al.

(10) Patent No.: US 8,211,563 B2
(45) Date of Patent: Jul. 3, 2012

(54) WET-TO-USE ORGANIC CELL BATTERY

(75) Inventors: Chung-Pin Liao, Taichung (TW);
Bin-Huang Yang, Taichung (TW);
Jun-Lang Chen, Sanchong (TW)

(73) Assignee: National Formosa University, Yunlin County (TW)

( * ) Notice: Subject to any disclaimer, the term of this patent is extended or adjusted under 35 U.S.C. 154(b) by 374 days.

(21) Appl. No.: 12/344,211

(22) Filed: Dec. 24, 2008

(65) Prior Publication Data

US 2009/0325067 A1    Dec. 31, 2009

(30) Foreign Application Priority Data

Jun. 30, 2008    (TW) .............................. 97124621 A

(51) Int. Cl.
*H01M 6/32* (2006.01)

(52) U.S. Cl. ....................................... 429/118; 429/188

(58) Field of Classification Search .............. 429/2, 110, 429/118, 119, 213, 188
See application file for complete search history.

(56) References Cited

U.S. PATENT DOCUMENTS 3,258,368 A * 6/1966 Robinson et al. ............. 429/347
5,506,072 A * 4/1996 Griffin et al. ................. 429/188

* cited by examiner

*Primary Examiner* — Gregg Cantelmo
(74) *Attorney, Agent, or Firm* — Pai Patent & Trademark Law Firm; Chao-Chang David Pai

(57) ABSTRACT

A wet-to-use organic cell battery includes a container filled with an electrolyte that is made from organic materials, an electrolyte solution, such as water, can be repeatedly added into the container to mix with the electrolyte, and two electrodes electrically connected to a mixture of the electrolyte and the electrolyte solution, and insulated from each other. Thus, the organic cell battery of the present invention has the advantages of being able to preserve the electrodes from consumption and rustiness, being refreshable, and being benign to environment and public health.

2 Claims, 1 Drawing Sheet

WET-TO-USE ORGANIC CELL BATTERY

BACKGROUND OF THE INVENTION

1. Field of the Invention

The present invention relates generally to a battery, and more specifically to a wet-to-use organic cell battery.

2. Description of the Related Art

A conventional battery includes the primary battery, the lead-acid battery or the rechargeable secondary battery. By taking the primary battery as an example, it stores electrolyte that facilitates the generation of electricity by means of chemical reactions between the electrodes through it. When the battery is electrically connected to an electrical element by a wire electrically connected to the cathode and the anode of the battery, electrons will move from the cathode to the anode through the electrolyte to create an electric current, thereby supplying power to the electrical element.

Once the chemical energy is exhausted (or, the chemical potential gradient is depleted), the battery cannot be recharged and may be discarded by a user. However, if the used battery is disposed without discretion, it may release the toxic electrolyte to the surroundings, causing environmental pollution and posing threat to the public health.

There is a water-activated battery that works by adding water to seep through active carbon contained in an absorbent cotton, thereby causing a current flowing path. Nevertheless, because the electrodes of the water-activated battery are made of stainless steel, the stainless electrodes will gradually rust and erode after a long period of contacting water, resulting in abnormal operation of the water-activated battery.

SUMMARY OF THE INVENTION

The present invention has been accomplished in view of the above-noted circumstances. It is one objective of the present invention to provide an organic cell battery, which prevents electrodes from being consumed, rusted and eroded.

It is another objective of the present invention to provide an organic cell battery, which won't cause environmental pollution and pose threat to public health.

To achieve these objectives of the present invention, the organic cell battery comprises a container filled with an electrolyte that is made of organic materials, an electrolyte solution repeatedly added into said container to mix with said electrolyte, and two organic electrodes electrically connected to a mixture of said electrolyte and said electrolyte solution, and insulated from each other.

Accordingly, by means of adopting the organic electrolyte and the organic electrodes, the organic cell battery of the present invention can prevent environmental pollution and pose no threat to public health, and by means of the electrolyte solution, the organic cell battery of the present invention can prevent consumption and rustiness of the electrodes, and can be refreshed by wetting it in water.

The scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
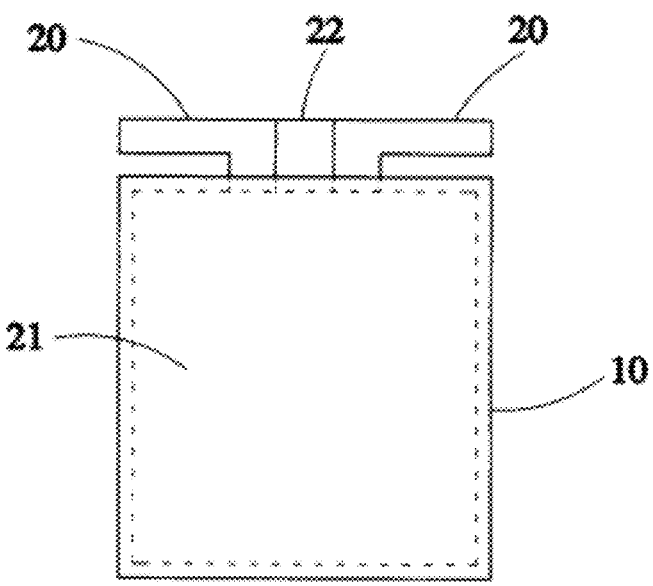
FIG. 1 is a front view of an organic cell battery according to a preferred embodiment of the present invention.
Figure 2:
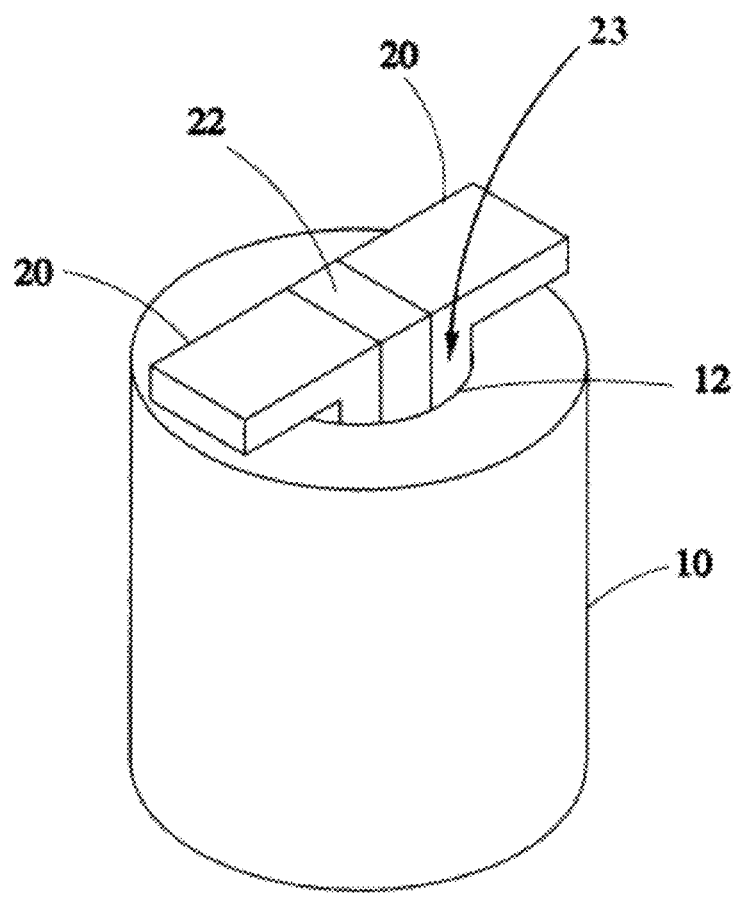
FIG. 2 is a perspective view of the organic cell battery according to the preferred embodiment of the present invention.

As shown in FIGS. 1 and 2, an organic cell battery in accordance with a preferred embodiment of the present invention comprises a container 10, an electrolyte solution 23, and two electrodes 20.

The container 10 has an internal space filled with an electrolyte 21 that is made of organic materials including chlorophyll or ionic salts, such as sodium salt, iodine salt, or soda, etc., and an opening 12 in communication with the internal space. In this embodiment, 50% of the electrolyte 21 is chlorophyll, and 50% of the electrolyte 21 is graphite.

The electrolyte solution 23 can be, but not limited to, water, salt solution, tea, cola, orange juice, or coffee, etc. . . . . . In this embodiment, the electrolyte solution 23 is saturated sodium chloride solution. When the electrolyte solution 23 is poured into the internal space of the container 10 through the opening 12 to mix with the electrolyte 21, a chemical reaction will proceed.

The electrodes 20 are put into the internal space of the container 10 through the opening 12 so as to be electrically connected to a mixture of the electrolyte 21 and the electrolyte solution 23, and the electrodes 20 are insulated from each other by means of an insulator 22 located between the electrodes 20. One of the electrodes 20 is made of metal oxides, such as manganese oxide (MnO), zinc oxide (ZnO), or magnesium oxide (MgO), etc., to be the cathode of the organic cell battery, and the other of the electrodes 20 is made of graphite to be the anode of the organic cell battery.

By means of the aforesaid design, when the organic cell battery is electrically connected to an electric element, such as a light bulb, by a wire that is electrically connected to the electrodes 20, electrons will move from the cathode to the anode through the mixture of the electrolyte 21 and the electrolyte solution 23 to create an electric current due to the chemical reaction occurring between the two electrodes 20 through the electrolyte 21 and the electrolyte solution 23, thereby supplying power to the electrical element, especially for the low-energy electrical element, until the organic cell battery is exhausted. An obvious ramification of the present invention is one in which one of the electrode 20 can merge with the electrolyte 21 and maintain as an electrical ground.

When the organic cell battery is discarded due to exhaustion, the electrolyte 21 and electrodes that are made of the organic materials can be absorbed and decomposed completely by soil without creating toxic substances to contaminate environment. Further, the electrolyte solution 23 can be repeatedly added into the container 10 for enabling the organic cell battery to be refreshable once it is dipped in water or water solutions of any kind In contrast to the conventional primary battery, the organic cell battery of the present invention has the advantages of environmental protection, the capability of being rechargeable, and preservation of the electrodes from consumption and rustiness; moreover, the organic cell battery of the present invention can supply an operating voltage of 1.5 V and an operating current of 150 mA when its size is the same as an ordinary AA size battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An organic cell battery comprising:
   a container filled with an electrolyte that contains chlorophyll;
   an electrolyte solution containing water, the electrolyte solution being added into said container to be mixed with said electrolyte; and
   two electrodes electrically connected to a mixture of said electrolyte and said electrolyte solution, and insulated from each other, wherein one of said electrodes is made of a material selected from the group consisting of manganese oxide (MnO), zinc oxide (ZnO), and magnesium oxide (MgO), and the other of said electrodes contains graphite.

2. The organic cell battery as claimed in claim 1, wherein 50% of said electrolyte is said chlorophyll.

* * * * *